United States Patent [19]

Ramm

[11] Patent Number: 4,806,279

[45] Date of Patent: Feb. 21, 1989

[54] METHOD OF PRODUCING IMPREGNATED SYNTHETIC ROCK PRECURSOR

[75] Inventor: Eric J. Ramm, Lilli Pilli, Australia

[73] Assignees: Australian Atomic Energy Commission; Australian National University, both of Australia

[21] Appl. No.: 936,235

[22] Filed: Dec. 1, 1986

[30] Foreign Application Priority Data

Nov. 29, 1985 [AU] Australia ............................ PH3648

[51] Int. Cl.[4] ............................ G21F 9/6; G21F 9/16; B01F 11/00; B29C 67/00

[52] U.S. Cl. .................................... 252/633; 209/920; 209/922; 100/38; 250/506.1; 252/628; 252/629; 264/0.5; 264/332; 264/125; 366/111; 366/114

[58] Field of Search ............... 252/628, 626, 629, 633, 252/632; 241/3, 23; 209/920, 921, 922; 250/505.1, 506.1, 507.1; 264/0.5, 319, 322, 332, 125; 419/48, 51; 72/59; 100/38, 226, 227; 366/108, 111, 114, 154; 222/161

[56] References Cited

U.S. PATENT DOCUMENTS

| | | | |
|---|---|---|---|
| 3,628,658 | 12/1971 | Cotter | 209/920 |
| 4,172,807 | 10/1979 | Larker | 252/629 |
| 4,274,976 | 6/1981 | Ringwood | 252/629 |
| 4,329,248 | 5/1982 | Ringwood | 252/629 |
| 4,462,508 | 7/1984 | Grafius | 209/920 |
| 4,632,778 | 12/1986 | Lehto et al. | 252/629 |
| 4,636,336 | 1/1987 | Gay et al. | 252/631 |
| 4,642,204 | 2/1987 | Burstrom et al. | 252/629 |
| 4,645,624 | 2/1987 | Ramm et al. | 252/628 |

FOREIGN PATENT DOCUMENTS

| | | | |
|---|---|---|---|
| 2611954 | 9/1977 | Fed. Rep. of Germany | 252/629 |
| 0116100 | 7/1984 | Japan | 252/629 |

OTHER PUBLICATIONS

Metal Powder Report vol. 32, No. 3. Mar. 1977, *HIP to Process Nuclear Waste,* pp. 98–99.

Walgate. 1982. Synroc presses on In Australia. Nature 300(9): 470.

*Primary Examiner*—Howard J. Locker

*Attorney, Agent, or Firm*—Ostrolenk, Faber, Gerb & Soffen

[57] ABSTRACT

A vibratory processing arrangement including an apparatus comprising three main stages. Namely, a high level waste vibrating impregnator, a vibrating calciner and a vibratory powder mixer.

The waste impregnator comprises a downwardly inclined trough having flexible mountings and a vibrator at its upstream end, a hood structure and a series of liquid sprays connected to a high level waste supply tube.

The vibratory calciner comprises a downwardly inclined tube connected to a downstream discharge tube. The discharge tube has an inlet pipe for entry of reducing gas. The reducing gas passes upwardly through the tubes to a gas discharge take-off tube near the upstream end of the downwardly inclined tube. A vibrator is tuned to provide the desired flow rate through the downwardly inclined tube.

Calcined discharged powder falls downwardly into the vibratory mixer, which has a vibratory actuator and flexible mountings. Titanium powder is introduced into the vibratory mixer through a secondary inlet and is intimately mixed with the calcined discharged powder before being discharged into respective canisters.

14 Claims, 2 Drawing Sheets

METHOD OF PRODUCING IMPREGNATED SYNTHETIC ROCK PRECURSOR

FIELD OF THE INVENTION

The present invention relates to vibratory processing arrangements and is particularly concerned with such a processing arrangment applicable to impregnating solid particulate synthetic rock precursor in an active cell with high level radioactive waste. Subsequent hot pressing will cause the formation of synthetic rock in which the waste is immobolised.

BACKGROUND OF THE INVENTION

The present applicant and The Australian National University are the proprietors of a series of inventions in this field. Australian patent application No. AU-B65176/80 (now Pat. No. 531,250) describes a hot uniaxial pressing process including embodiments in which a canister having a generally cylindrical wall of bellows like formation is used to contain the supply material to be pressed and while heating is maintained pressure is applied by a hydraulic press. The synthetic rock product is formed as the bellows like canister is axially compressed.

A further patent application no. AU-72825/82 (now U.S. Pat. No. 524,883) describes a development of the hot uniaxial pressing in which the pressing is conducted in an upward direction against a fixed top abutment in the press.

The prior art referred to in the above specifications includes prior art of The Australian National University describing the formation of synthetic rock from selected phases and suitable for the immobilisation of radioactive waste.

Typically, synthetic rock precursor is in the form of a fine powder and high-level radioactive waste is a liquid which must be impregnated into the powder in the active cell and pressing must also take place in an active cell. Extremely reliable mechanical handling methods and equipment are required since it is desired for the equipment to operate for tens of years with servicing and repairs conducted only through remote manipulators.

SUMMARY OF THE INVENTION

The present invention is directed to processing arrangements and corresponding apparatus which can facilitate active cell processes which are highly reliable and conducted with equipment which is intrinsically relatively simple so that long working life and maintenance with remote manipulators can be provided.

According to a first aspect of the invention there is provided a method of producing impregnated synthetic rock precursor comprising:

- feeding particulate synthetic rock precursor into a vibratory conveying means having an elongated path along which the particulate material is progressively moved under vibration,
- spraying the particulate material with a liquid incorporating radioactive waste over an extended region of the elongated path such that the liquid is absorbed into the particulate material which continues to advance to the discharge end of the device, and
- discharging the impregnated synthetic rock precursor.

According to a second aspect of the invention, there is provided a method of preparing synthetic rock precursor for a hot uniaxial pressing process, the precursor being of particulate form and having impregnated therethrough radioactive waste, the method comprising passing the material into an upstream end of an elongated downwardly inclined tubular duct, establishing vibration of the tubular duct whereby the particulate material advances progressively and applying high level heating so as to calcine the particulate material, and discharging the calcined material at the downstream end of the apparatus.

According to the third aspect of the invention, there is provided an arrangement for mixing a titanium powder into a calcined synthetic rock precursor incorporating therein radioactive waste; the arrangement comprises using a tubular vibratory conveyor which is downwardly inclined in the downstream direction and the titanium powder is introduced just downstream of the synthetic rock precursor inlet to the vibratory tube, whereby intimate mixing of the particulate material occurs in a well controlled and continuous manner. The discharge can be to a receiving hopper and/or to a bellows-like container whereby the poured material is ready for a hot uniaxial pressing process.

PREFERRED FEATURES OF THE PRESENT INVENTION

Although preferably the invention is implemented in a continuous process in which the elongated path extends from spaced upstream and downstream ends. the process can also be operated with paths of different configuration and indeed can be operated in a batch process in which the vibratory conveying means causes the particulate precursor to move around within a suitable vessel as it is being sprayed with radioactive waste liquid. For example, a generally square trough-like vessel may be used and the vibratory conveyor means can cause the particulate material to circulate around the trough.

One very important embodiment of the invention is one in which heat is applied to the impregnated synthetic rock precursor thereby maintaining a substantially dry state and causing evaporation of water thereby leaving the radioactive material impregrating the waste. The level of heating is preferably relatively low e.g. 300° C. whereby the powder can remain in a flowable state and components of the radioactive waste which are volatile at higher temperatures remain substantially in the synthetic rock.

The conveyor may be inclined either upwardly or downwardly or may be horizontal. This is dictated by the physical form of the precursor.

Preferably the invention is implemented in a generally trough-like vibratory conveyor and has a vibrating element applied near its upstream end, its downstream end being supported in a flexible mounting and remaining substantially stationary.

Preferably a series of spray heads are spaced along the trough-like conveyor.

In a preferred embodiment, the synthetic rock precursor is formed into granules having an improved pourability and packing density compared with the particles of synthetic rock precursor; it has been found that use of this aspect of the invention permits very effective impregnation of such granules with highly uniform dispersion of radioactive components through the final synthetic rock produced after a hot uniaxial pressing process.

Preferably, the apparatus is arranged to provide an operating temperature of about 750° C.

The calcining apparatus preferably has a variable frequency vibration unit which preferably is directed to actuate vibrations at the downstream end of the tube, the upstream end being mounted in suitable flexible mountings and substantially not moving.

With advantage, induction heating can be used for the furnace which can be surrounded by insulating material.

Furthermore, in the second aspect of the invention a most advantageous embodiment is one in which the tubular duct is connected to a gas circulation system whereby a controlled atmosphere can be passed preferably in a counter current arrangement through the tubular duct, whereby volatile radioactive components from the waste can be taken up and removed through suitable filtering arrangements.

This aspect of the invention permits a reliable and very compact capital effective plant to be devised thereby obviating the complexity and very considerable volume required for an apparatus such as a rotary calciner. The capital cost per cubic meter of an active cell is very high and therefore a major impact on the economics of safe disposal of radioactive material may result from use of embodiments of the present invention.

Various embodiments of the invention can contribute substantially to a most effective plant for high level waste immobilisation in synthetic rock by providing a compact and reliable process substantially avoiding the handling of any solids other than dry pourable solids at each stage.

In a most effective and important embodiment all three of the above aspects of the invention are used in combination in sequence and furthermore a further inventive combination is one in which the above three aspects are used in combination with the further inventive step the subject of the present applicant's co-pending application entitled "Formation of Ceramics" and which is directed to an invention consisting in an apparatus for hot uniaxial pressing of heat resistant metal canisters containing synthetic rock components, the canisters having a generally cylindrical wall incorporating bellows-like formations, the apparatus comprising a hydraulic press having an upwardly acting ram with a refractory facing thereon for supporting the bottom of the canister, a fixed top abutment, a heating zone immediately below the abutment and adapted to surround the bellows container during the hot uniaxial pressing process and a retractable platen adapted to be inserted laterally into the press below the heating zone such that a bellows canister can be placed on the refractory facing and partially compressed at ambient temperature by upward displacement of the hydraulic press, the platen being removable to permit the press to be displaced upwardly to a higher level whereby the bellows-like canister is inserted within the heating zone and abuts against the top abutment.

BRIEF DESCRIPTION OF THE DRAWINGS

For illustrative purposes only an embodiment will be described with reference to the accompanying drawings of which.

DETAILED DESCRIPTION OF THE INVENTION

Figure 1:
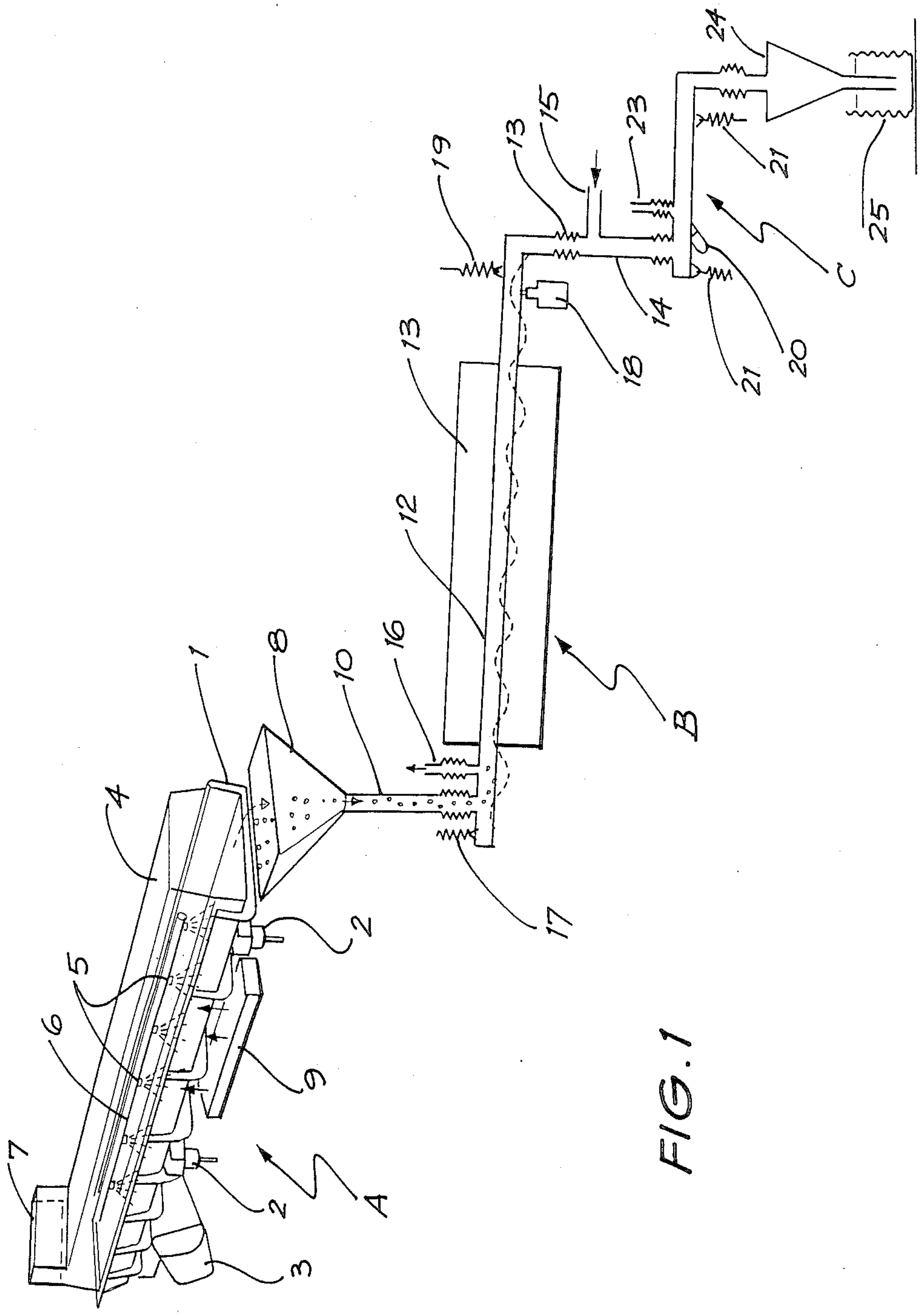
FIG. 1 illustrates schematically the processing steps for impregnating synthetic rock precursor and filling bellows-like canisters for use in a hot uniaxial pressing process for the production of synthetic rock.

The apparatus shown in FIG. 1 comprises three main stages:

A. High level waste vibratory impregnator

B. Vibratory calciner and

C. Vibratory powder mixer

The waste impregnator A. comprises a downwardly inclined trough 1 having flexible mountings 2 and a vibrator 3 at its upstream end, a hood structure 4 and a series of liquid sprays 5 connected to a high level waste supply tube 6.

The hood structure 4 has, at its upstream end, an inlet hopper 7 through which synthetic rock precursor material in powder or preferably in granulated form is poured. This powder is formed outside the active cell and is not radioactive. By operation of the vibrator 3, the powder continuously and steadily moves down the trough ready for discharge at the open downstream end into a discharge hopper 8. As the precursor moves down the trough it is impregnated through the sprays 5 with a solution of high level waste, the spray rate being controlled so that the powder remains sufficiently dry to remain in a fluidised and pourable state. A radiant heating unit 9 is located beneath the trough, as schemically shown, and causes evaporation of the aqueous solvent from the radioactive waste at a steady rate.

The impregnated precursor discharges through the hopper 8 into a discharge tube 10 and into the upstream end of the closed tube 12 of the vibratory calciner B.

The tube 12 is downwardly inclined and is connected through a downstream flexible coupling 13 to a discharge tube 14. Discharge tube 14 has an inlet pipe 15 for reducing gas (typically $N_2$/3 Volume % $H_2$ or $H_2$ alone). The reducing gas passes upwardly through the tube to a gas discharge take-off tube 16 near the upstream end. In this way volatile radioactive components produced during the calcining can be taken up and filtered out.

A furnace 13 surrounds the central region of the tube for causing the synthetic rock precursor to undergo partial mineral transformations and the nitrates associated with the high level waste are decomposed. Minor amounts of volatile radioactive components may be evolved. The furnace raises the temperature of the particulate material to about 750° C.

At its upstream end, a flexible mounting 17 supports the tube 12 and at its downstream end a variable frequency vibrator unit 18 is provided together with a flexible mounting 19.

The vibratory actuator 18 is tuned to provide the desired flow rate by varying frequency and ampitude.

The calcined discharged powder falls downwardly into a vibratory mixer C, having a vibratory actuator 20 and flexible mountings 21. A secondary inlet 23 is provided for titanium powder which is intimately mixed as the powders pass downwardly through the inclined tube to be discharged to a discharge hopper 24 from which bellows canisters 25 may be filled.

Figure 2:
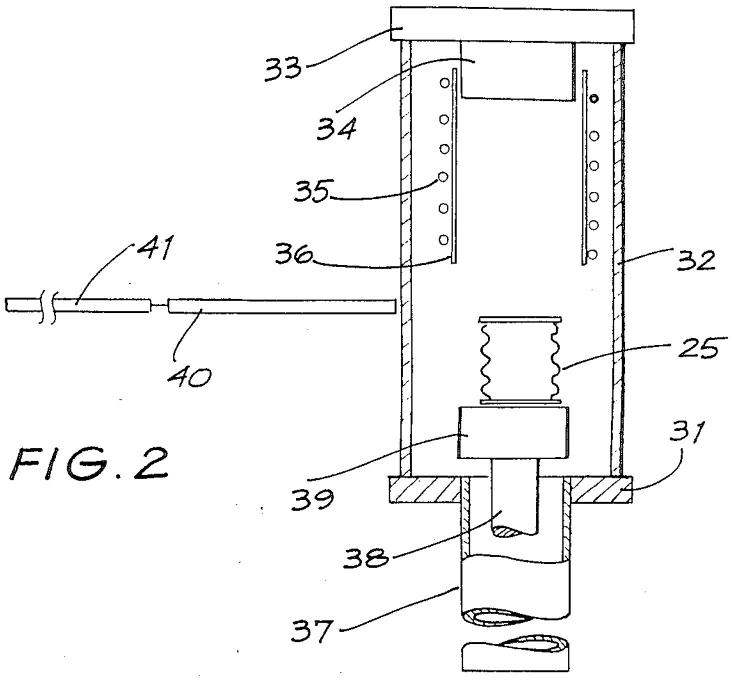
FIG. 2 is a schematic side elevation of a hydraulic press arranged in an active cell and ready for the first stage of cold precompaction.
Figure 3:
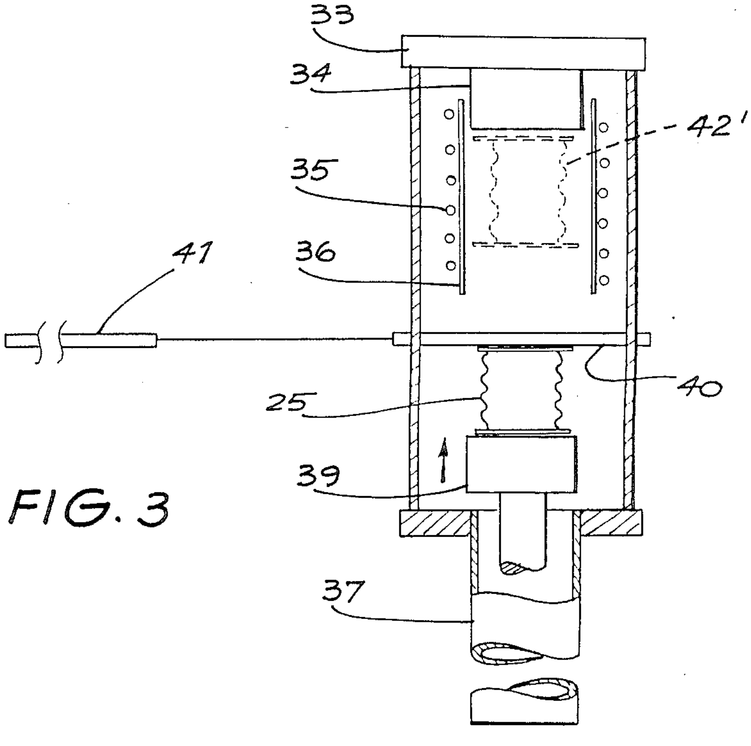
FIG. 3 is a view corresponding to FIG. 1 and showing the precompacation stage.

Reference will now be made to FIGS. 2 and 3 which illustrate how the filled canisters can be uniaxially pressed.

Referring to the drawings a hydraulic press comprises a fixed base 31, an open, upwardly extending framework 32, a fixed top press frame 33, a refractory top pad 34 and just below the top pad a heating unit comprising an electrical induction coil 35 with a cylindrical metal sleeve 36 functioning as a susceptor sleeve. Furthermore, the press has an upwardly acting hydraulic ram 37 with a piston 38 on the top of which a refractory top pad 39 is mounted.

For the purpose of cold pre-compaction of the canisters 25, the hydraulic press incorporates a retractable plate-like platen 40 which is horizontaly slidably displacable in guides (not shown) by actuation of a secondary ram 41.

FIG. 2 shows the first stage in which a bellows canister 25 has been placed on the refractory bottom pad 39. The canister is of a heat resistant alloy or steel such as INCONEL 601. As filled through hopper 24 (FIG. 1), the calcined impregnated synthetic rock will have a typical density of 19% of the maximum theoretical density of the final synthetic rock. A cold precompaction is applied by first actuating the ram 41 to displace horizontally the platen 40 to adopt the position shown in FIG. 3 and then the hydraulic ram 47 is actuated to place the bellows canister 25 into abutment with the platen 40. pressure is maintained until the density of the synthetic rock powder approaches the maximum which can be achieved at ambient temperatures. e.g. about 35% theoretical maximum density. Typically the press will be operating at the order of 20 Mpa and the time for this pressing step will be the order of 3 minutes.

The ram 37 is then lowered slightly, the ram 41 actuated to retract the platen 40. and (unless an optional separate pre-heating furnace is used) the ram 37 is raised to place the bellows container within the heating zone and to occupY the position shown in dotted lines and referenced 42'. It is necessary to heat he bellows container and its contents to a typical temperature in the range 1050° to 1260° C. and this will take typically 510 minutes for a 40 cm diameter bellows canister. Subsequently, pressure can be applied through the ram so that the bellows canister is in abutment with the top pad 34 and pressures of about 14 Mpa or higher are applied for several hours until full compression of the bellows canister occures and a density of about 99% theoretical density is achieved.

It will be appreciated that during normal operations the induction coil is continuously operated and appropriate insulation material surrounds the upper part of the press to reduce heat losses. However, the bottom pad 39 is itself raised to very high temperatures and as soon as the canister 25 is placed on top of the pad there will be a heat flow into the metal forming the walls of the canister. It has, interestingly, been found that nevertheless, an effective precompaction can occur in the manner described above and the shape of the bellows container achieved during the final hot uniaxial pressing stage is highly predictable, and repeatable.

We claim:

1. A method of producing impregnated synthetic rock precursor comprising:

feeding particulate synthetic rock precursor into a vibratory conveying means having an elongated path along which the particulate material is progressively moved under vibration, spraying the particulate material with a liquid comprising radioactive waste over an extended region of the elongated path such that the liquid is absorbed into the particulate material which continues to advance to the discharge end of the device, applying heat over an extended region of said elongated path for maintaining the synthetic rock precursor in a substantially dry state and causing evaporation of water contained in said liquid, and discharging the impregnated synthetic rock precursor.

2. A method as claimed in claim 1 characterised by the continuous vibratory conveying means having an elongated path extending from spaced upstream and downstream ends.

3. A method as claimed in claim 1 or claim 2 characterised by a temperature of the order of 300° C. being established in the synthetic rock precursor passing along said elongated path.

4. A method as claimed in claim 3, characterised in that the conveying means used has a generally trough-like form and has a vibrating element connected thereto near its upstream end, the downstream end of the vibratory conveyor being mounted and supported in flexible mountings and remaining substantially stationary.

5. A method as claimed in claim 5, characterised by the conveyor means using a multiplicity of spray heads spaced along and above said elongated path for spraying said liquid.

6. A method as claimed in claim 5 and characterised by including taking synthetic rock precursor in powder form and forming the precursor into a granulated form and supplying the granulated form of the precursor to be fed into said vibratory conveying means.

7. A method as claimed in claim 6, further characterised by advancing said impregnated synthetic rock precursor in flowable particulate form into an elongated downwardly inclined tubulate duct, establishing vibration of the tubular duct and applying high level heating so as to calcine the synthetic rock precursor during its passage along said duct, and disoharging the calcined synthetic rock precursor at the downstream end of the duct.

8. A method as claimed in claim 7 and characterised in that said applied high level heating establishes a temperature of the order of 750° C. in the synthetic rock precursor passing down the duct.

9. A method as claimed in claim 7 and characterised in that said step of establishing vibration of the tubular duct is effected by a vibrator unit connected to the downstream region of the tubular duct, the upstream end of the tubular duct being mounted in flexible mountings and the method further comprising adjusting the frequency of vibrations to control the flow rate of the synthetic rock precursor.

10. A method as claimed in claim 9 and characterised by using a gas circulation system through said tubular duct and controlling the atmosphere within the tubular duct, gas extracted from the tubular duct being filtered to remove volatile radioactive components taken up from the radioactive waste content of the synthetic rock precusor.

11. A method as claimed in claim 10 and characterised by mixing titanium powder into the discharged calcined synthetic rock precursor by using a vibratory conveyor which is downwardly inclined in the downstream direction, the titanium powder being mixed into the synthetic rock precursor near the upstream end of said vibratory conveyor.

12. A method of producing canisters containing compacted, impregnated synthetic rock precursor, the precursor being impregnated with radioactive waste and the canisters being adapted to be treated in a hot pressing operation whereby the radioactive waste is immobilised in a matrix of synthetic rock in the canisters, the method characterised by processing synthetic rock precursor by a method as claimed in claim 11 and further comprising pouring the synthetic rock precursor into a canister having a generally cylindrical form with a bellows like cylindrical wall and flat end walls, closing the canister after pouring the synthetic rock precursor into the canister and effecting a cold precompaction by uniaxial pressing along the axis of the canister.

13. A method as claimed in claim 12 and characterised in that the cold precompaction of each bellows canister is effected using an apparatus comprising a hydraulic press having an upwardly acting ram with a refractory facing thereon for supporting the bottom of the canister, a fixed top abutment, a heating zone immediately below the abutment and adapted to surround the bellows container during the hot uniaxial pressing process and a retractable platen adapted to be inserted laterally into the press below the heating zone such that a bellows canister can be placed on the refractory facing and partially compressed at ambient temperature by upward displacement of the hydraulic press, the platen being removable to permit the press to be displaced upwardly to a higher level whereby the bellows-like canister is inserted within the heating zone and abuts against the top abutment.

14. A method as claimed in claim 8 and characterized in that said step of establishing vibration of the tubular duct is effected by a vibrator unit connected to the downstream region of the tubular duct, the upstream end of the tubular duct being mounted in flexible mountings and the method further comprising adjusting the frequency of vibrations to control the flow rate of the synthetic rock precursor.

* * * * *